(12) United States Patent
Wang et al.

(10) Patent No.: US 11,965,045 B2
(45) Date of Patent: Apr. 23, 2024

(54) METHOD OF FORMING AN ETCHED PART AND A METHOD OF FORMING A METAL PLATED PART

(71) Applicant: Ford Global Technologies, LLC, Dearborn, MI (US)

(72) Inventors: Xiaojiang Wang, Saline, MI (US); Shannon Christine Bollin, South Lyon, MI (US); Robert D. Bedard, Allen Park, MI (US); Matthew Cassoli, Southgate, MI (US); Ellen Cheng-Chi Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/319,746

(22) Filed: May 18, 2023

(65) Prior Publication Data

US 2023/0287161 A1    Sep. 14, 2023

Related U.S. Application Data

(63) Continuation of application No. 17/025,397, filed on Sep. 18, 2020, now Pat. No. 11,692,049.

(51) Int. Cl.
| | |
|---|---|
| *C08F 220/18* | (2006.01) |
| *B29C 64/129* | (2017.01) |
| *B33Y 10/00* | (2015.01) |
| *B33Y 70/00* | (2020.01) |
| *C08F 2/48* | (2006.01) |
| *C08F 216/12* | (2006.01) |
| *C08F 222/10* | (2006.01) |
| *C23C 18/16* | (2006.01) |

(Continued)

(52) U.S. Cl.
CPC ........ *C08F 220/1808* (2020.02); *C08F 2/48* (2013.01); *C08F 216/125* (2013.01); *C08F 220/1804* (2020.02); *C08F 222/102* (2020.02); *C23C 18/1641* (2013.01); *C23C 18/1651* (2013.01); *C23C 18/2013* (2013.01); *C23C 18/32* (2013.01); *C23C 18/38* (2013.01); *C23C 18/50* (2013.01); *B29C 64/129* (2017.08); *B33Y 10/00* (2014.12); *B33Y 70/00* (2014.12)

(58) Field of Classification Search
CPC ........ C08F 220/1808; C08F 220/1804; C08F 2/48; C08F 222/102; C08F 216/125; C23C 18/1641; C23C 18/2013; C23C 18/38; C23C 18/32; C23C 18/50; C23C 18/1651; B33Y 70/00; B33Y 10/00; B29C 64/129
USPC ....................................... 524/556
See application file for complete search history.

(56) References Cited

U.S. PATENT DOCUMENTS

| | | | | |
|---|---|---|---|---|
| 5,354,593 A | * | 10/1994 | Grandmont | ......... H01L 21/4857 428/209 |
| 10,676,572 B1 | * | 6/2020 | Rodriguez | ........... C08G 75/045 |

(Continued)

*Primary Examiner* — Michael M. Bernshteyn
(74) *Attorney, Agent, or Firm* — Burris Law, PLLC

(57) ABSTRACT

A method of forming an etched part includes forming a substrate including a thermoset resin and etching a surface of the substrate. The thermoset resin includes a vat photopolymerization (VPP) thermoset resin and at least one of an etchable phase and etchable particles disposed within the VPP thermoset resin. The etching removes the etchable phase from the VPP thermoset resin at the surface of the substrate such that a plurality of micro-mechanical bonding sites are formed on an etched surface of the substrate.

20 Claims, 3 Drawing Sheets

(51) Int. Cl.
    *C23C 18/20*        (2006.01)
    *C23C 18/32*        (2006.01)
    *C23C 18/38*        (2006.01)
    *C23C 18/50*        (2006.01)

(56) References Cited

U.S. PATENT DOCUMENTS

| | | | |
|---|---|---|---|
| 11,446,858 B2 * | 9/2022 | Belitzky | C09D 11/52 |
| 11,692,049 B2 * | 7/2023 | Wang | C08F 2/50 |
| | | | 524/556 |
| 2018/0290377 A1 * | 10/2018 | Talken | C08F 220/34 |
| 2019/0291346 A1 * | 9/2019 | Rudolph | B33Y 10/00 |

* cited by examiner

METHOD OF FORMING AN ETCHED PART AND A METHOD OF FORMING A METAL PLATED PART

CROSS-REFERENCE TO RELATED APPLICATION

This application is a continuation of and claims the benefit of U.S. patent application Ser. No. 17/025,397, filed Sep. 18, 2020, now U.S. Pat. No. 11,692,049, and titled "ADDITIVELY MANUFACTURED THERMOSET POLYMERS FOR METAL PLATING AND METAL PLATED PARTS FORMED THEREFROM," the content of which is incorporated herein by reference in its entirety.

FIELD

The present disclosure relates to thermoset polymers and particularly to thermoset polymers for metal plating.

BACKGROUND

The statements in this section merely provide background information related to the present disclosure and may not constitute prior art.

Thermoplastic polymers such as acrylonitrile butadiene styrene (ABS) are used to form injection molded parts that are subsequently metal plated. Also, injection molded parts formed from such polymers generally have a "smooth" surface that, after etching, allows for a metal plated coating with a desired surface appearance to be formed on the surface. However, such thermoplastic polymers cannot be used in forming parts via Vat Photopolymerization (VPP) additive manufacturing (AM) techniques, and thermoplastic usage in other AM techniques present aesthetic limitations. For example, ABS has been used to form parts using fused filament fabrication (FFF), however FFF produces visible layer lines on surfaces of formed parts, thereby limiting the smoothness, crispness and/or resolution of graphics that can be produced on the surface of such parts.

These challenges with additive manufacturing via VPP parts from thermoset polymers, among other issues related to thermoset polymers, are addressed by the present disclosure.

SUMMARY

In one form of the present disclosure, a method of forming an etched part includes forming a substrate including a thermoset resin and etching a surface of the substrate. The thermoset resin includes a vat photopolymerization (VPP) thermoset resin and at least one of an etchable phase and etchable particles disposed within the VPP thermoset resin. The etching removes the etchable phase from the VPP thermoset resin at the surface of the substrate such that a plurality of micro-mechanical bonding sites are formed on an etched surface of the substrate.

In variations of this form, which may be implemented individually or in any combination: the forming the substrate includes forming, layer-by-layer, an additively manufactured part; the method further includes curing each layer of thermoset resin after depositing each layer of thermoset resin; the forming the substrate includes one of stereolithography additive manufacturing, digital light processing additive manufacturing, and continuous liquid interface production additive manufacturing; the VPP thermoset resin includes at least one monomer, at least one oligomer, and at least one photo initiator; the at least one monomer is selected from the group consisting of a (meth)acrylate monomer and a vinyl ether; the (meth)acrylate monomer includes at least one of a monofunctional monomer, a difunctional monomer, and a multifunctional monomer, and wherein the vinyl ether includes at least one of diethylene glycol divinyl ether (DEGDE), cyclohexane dimethanol divinyl ether (CHDMDE), and triethylene glycol divinyl ether (TEGDE); the at least one oligomer includes at least one acrylated oligomer selected from the group consisting of polyurethane (meth)acrylate, polyether (meth)acrylate, polyester (meth)acrylate, epoxy (meth)acrylate, phenolic (meth)acrylate, amino (meth)acrylate, and silicone (meth) acrylate; the etchable phase includes a resin phase selected from the group consisting of polybutadiene (meth)acrylate, polyisoprene (meth)acrylate, polychloroprene (meth)acrylate, unsaturated polyester (meth)acrylate, and alkyd (meth)acrylate; the thermoset resin includes both an etchable phase and etchable particles disposed within the VPP thermoset resin; the etchable particles include at least one of metal particles, metal oxide particles, and metal carbonate particles; the metal particles include at least one of iron and aluminum, the metal oxide particles include at least one of alumina, magnesium oxide, and zinc oxide, and the metal carbonate particles include at least one of calcium carbonate, barium carbonate, and magnesium carbonate; the etching includes using an etchant, and wherein the etchant includes at least one of oxidizing acid solutions and chromic acid etchants; and the method further includes bonding a metal layer to the etched surface of the substrate.

In another form of the present disclosure, a method of forming a metal plated part includes forming a substrate via vat photopolymerization (VPP), etching a surface of the substrate to remove at least a portion of the etchable phase proximate the surface of the substrate and to form a plurality of micro-mechanical locking sites at the surface of the substrate, and forming a metal layer on the etched surface of the substrate, such that the metal layer is bonded to the etched surface of the substrate at the plurality of micro-mechanical locking sites. The substrate includes a thermoset resin with an etchable phase disposed therein.

In variations of this form, which may be implemented individually or in any combination: forming the metal layer includes at least one of electroplating, electroless plating, physical vapor deposition (PVD), vacuum metallization, and spray metal coating; the metal layer includes at least one of a chromium layer, a chromium alloy layer, a nickel layer, a nickel alloy layer, a copper layer, a copper alloy layer, an aluminum layer, an aluminum alloy layer, and combinations thereof; at least a portion of the metal layer is encapsulated within the etched surface of the substrate; the thermoset resin includes a mixture of monomers, oligomers, and photoinitiators; and the etchable phase includes at least one of organic particles, organic resins, inorganic particles, and copolymers of the thermoset resin.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
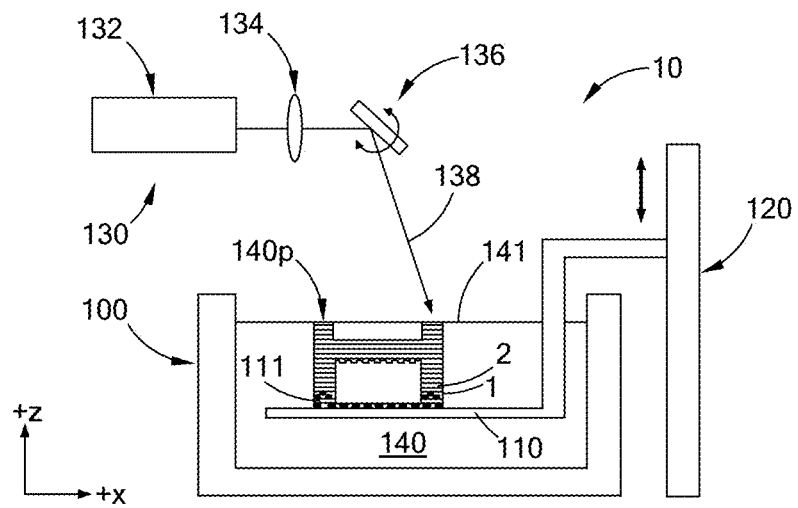
FIG. 1 shows a stereolithography system for additive manufacturing a thermoset resin according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a thermoset resin for forming parts via vat photopolymerization (VPP), and the VPP formed parts can be metal plated using standard or conventional metal plating techniques and equipment. The thermoset resin includes a VPP thermoset resin and an etchable phase disposed in the VPP thermoset resin. The thermoset resin is particularly well suited for forming parts using stereolithography (SLA) additive manufacturing (AM), digital light processing (DLP) AM and continuous liquid interface production (CLIP) AM. The VPP formed parts are etched and then metal plated using standard or conventional metal plating techniques and equipment. As used herein the term "photopolymerization" refers to synthesis of polymers by chain reactions that are initiated and propagated upon the absorption of light (e.g., ultraviolet light) by a polymerizable system, light serving only as an initiating tool that does not interfere with the propagation and termination stages of the chain process.

Figure 2:
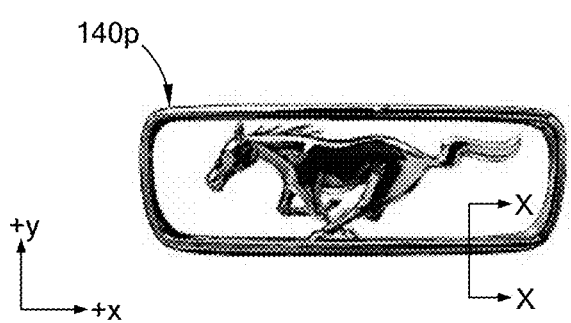
FIG. 2 is a side view of a metal plated part formed via vat photopolymerization of a thermoset resin according to the teachings of the present disclosure.

Referring to FIG. 1, a stereolithography (SLA) system 10 is shown. The SLA system 10 includes a vat 100, a platform 110, an elevator 120 configured to move the platform 110 up (+z direction) and down (−z direction), and a light scanning system 130. A VPP thermoset resin 140 (also referred to herein simply as "thermoset resin") is disposed within the vat 100. The light scanning system 130 includes a light source 132, e.g., an ultraviolet laser, light beam shaping optics 134, and an x-y scanner 136 (e.g., a mirror) configured to directed a light beam 138 along a predefined pattern on a surface 141 of the thermoset resin 140 disposed in the vat 100. The platform 110 can include a support 111 on which AM of a part 140p is formed layer-by-layer. For example, a first layer '1' of cured thermoset resin 140c (FIG. 3) is formed by positioning the platform 110 and/or the support 111 just below (−z direction) the surface 141 of the thermoset resin 140 such that a layer of predefined thickness (z direction) of the thermoset resin 140 is disposed on the platform and/or support 111. Then, the light scanning system 130 directs the light beam 138 along the predefined pattern to form a first layer '1' of cured thermoset resin 140c. And after the first layer 1 of cured thermoset resin 140c is formed, the elevator 120 moves the platform 110 down (−z direction) a predefined distance such that a second layer '2' of the thermoset resin 140 flows and is disposed over the first layer 1 of cured thermoset resin 140c. Then, the light scanning system 130 directs the light beam 138 along another predefined pattern, which may be the same or different than the previous predefined pattern, to form the second layer 2 of cured thermoset resin 140c. This cycle continues until an AM part 140p is completely formed, layer-by-layer. An example of such an AM part 140p formed using the AM technique described above is shown in FIG. 2.

While FIG. 1 provides an example of one type of AM system and/or technique, it should be understood that other AM techniques such as, but not limited to, DLP AM and CLIP AM can be used for forming AM parts with the thermoset resin according to the teachings of the present disclosure.

Figure 3:
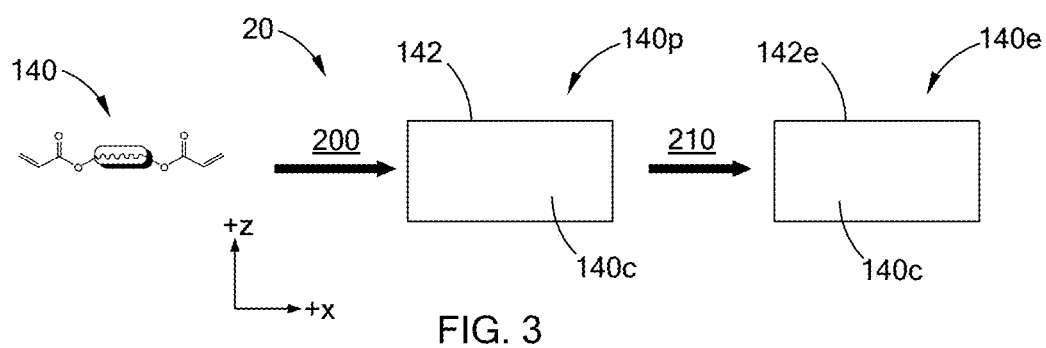
FIG. 3 is a cross-sectional view of a substrate, before and after etching of the substrate, formed from a resin according to the prior art via vat photopolymerization.

Referring to FIG. 3, a method 20 of forming an etched AM part 140e using a VPP thermoset resin 140 known in the art is shown. Particularly, the VPP thermoset resin 140 is used to form the AM part 140p layer-by-layer at step 200 and the AM part 140p is etched at step 210 to form the etched AM part 140e. The AM part 140p is formed from successive layers of cured thermoset resin 140c as discussed above, and has a surface 142 that is exposed to an etchant at step 210 such that an etched surface 142e is provided. Not limiting examples of etchants used to etch the surface 142 include oxidizing acid solutions such as $MnO_2$—$H_2SO_4$ etchants, $MnO_2$—$H_3PO_4$—$H_2SO_4$ etchants, chromic acid etchants, among others.

As shown in FIG. 3, the etched surface 142e is without the presence of or does not have micro-mechanical bonding sites for bonding a metal coating (not shown) to the etched surface 142e. That is, the VPP thermoset resin 140 does not have any phase(s) or particles that are suitable for removal via etching. Accordingly, it should be understood that the etched surface 142e does not lend itself to metal plating since the lack of micro-mechanical bonding sites on the etched surface 142e inhibits bonding of a metal coating deposited onto the etched surface 142e.

Figure 4:
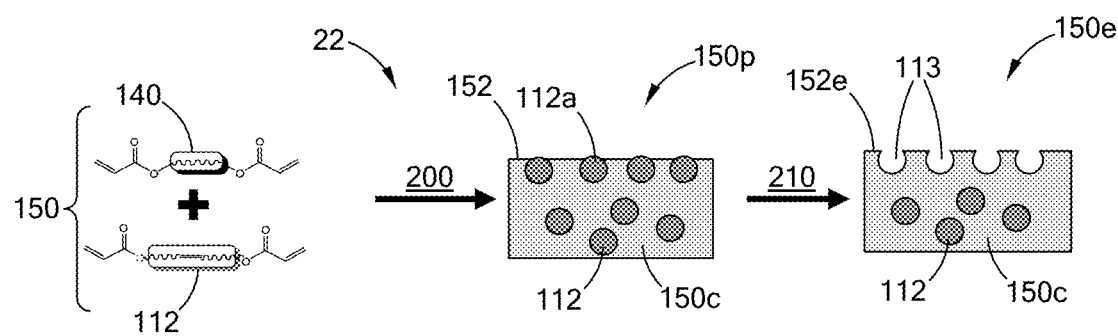
FIG. 4 is a cross-sectional view of a substrate, before and after etching of the substrate, formed via vat photopolymerization using a resin according to one form of the present disclosure.

Referring now to FIG. 4, a method 22 of forming an etched AM part 150e using a thermoset resin 150 according to the teachings of the present disclosure is shown. Particularly, the thermoset resin 140 in FIG. 1 is replaced with the thermoset resin 150. Also, the thermoset resin 150 includes the VPP thermoset resin 140 and an etchable phase 112 disposed in the VPP thermoset resin 140. In the example shown in FIG. 4, the etchable phase 112 is the in the form of a resin phase that can be etched with known etchants such those listed above. Non-limited examples of such resin phases include polybutadiene (meth)acrylate, polyisoprene (meth)acrylate, polychloroprene (meth)acrylate, unsaturated polyester (meth)acrylate, alkyd (meth)acrylate, and other types of (meth)acrylated polymers which contain of unsaturated double bond function group on their backbones or side chains.

In some variations, the VPP thermoset resin 140 is a mixture of at least one monomer, at least one oligomer, and at least one photo initiator. Non-limiting examples of the at least one monomer include an (meth)acrylate monomer, a vinyl ether, among others. Also, the (meth)acrylate monomer can be at least one of a monofunctional monomer, a difunctional monomer, and a multifunctional monomer. For example, in some variations the (meth)acrylate monomer is at least one of 2-ethyl hexyl acrylate (EHA), n-butyl acrylates (BA), 1,4-butanediol diacrylate (BDDA), diethylene glycol diacrylate (DEGDA), bisphenol A-glycidyl methacrylate (Bis-GMA), bisphenol A ethoxylate diacrylate (Bis-EDA), trimethylolpropane triacrylate (TTA), and triethylene glycol dimethacrylate (TEGDMA), among others. Also, the vinyl ether can be at least one of diethylene glycol divinyl ether (DEGDE), cyclohexane dimethanol divinyl ether (CHDMDE), and triethylene glycol divinyl ether (TEGDE), among others.

In at least one variation, the VPP thermoset resin(s) of the present disclosure includes at least one acrylated oligomer. And in some variations, the at least one oligomer is polyurethane (meth)acrylate, polyether (meth)acrylate, polyester (meth)acrylate, epoxy (meth)acrylate, phenolic (meth)acrylate, amino (meth)acrylate, and silicone (meth) acrylate, among others.

Similar to forming the AM part 140p in FIG. 3, an AM part 150p is formed layer-by-layer at step 200 using the thermoset resin 150 and the AM part 150p is etched at step 210 to form the etched AM part 150e. However, and in contrast to the AM part 140p formed from the thermoset resin 140, the etchant removes or dissolves the etchable phase 112 from the thermoset resin 150 at the surface 152 such that a plurality of micro-mechanical bonding sites 113 are formed on an etched surface 152e. It should be understood that the micro-mechanical bonding sites 113 enhance bonding of a metal coating deposited on the etched surface 152e as shown and discussed below with reference to FIG. 7.

Figure 5:
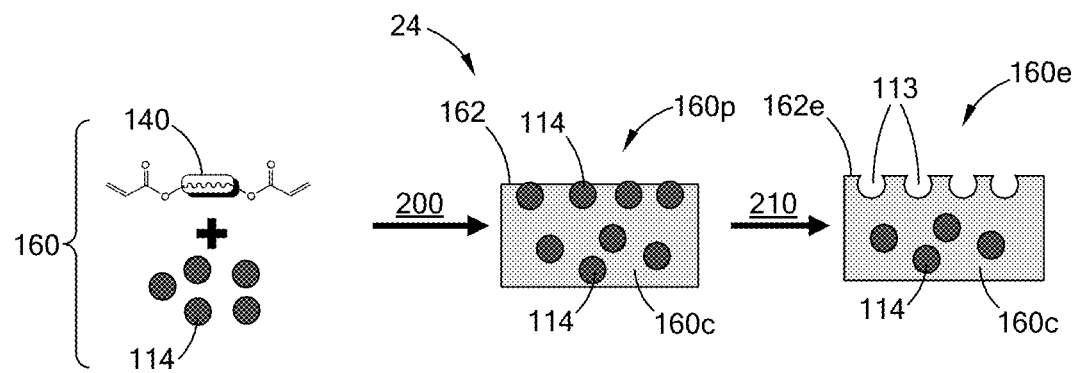
FIG. 5 is a cross-sectional view of a substrate, before and after etching of the substrate, formed via vat photopolymerization using a resin according to another form of the present disclosure.

Referring now to FIG. 5, a method 24 of forming an etched AM part 160e using a thermoset resin 160 according to the teachings of the present disclosure is shown. Particularly, the thermoset resin 140 in FIG. 1 is replaced with the thermoset resin 160. Also, the thermoset resin 160 includes the VPP thermoset resin 140 and another etchable phase 114 disposed in the VPP thermoset resin 140. In the example shown in FIG. 5, the etchable phase 114 is the in the form of particles (also referred to herein as "etchable particles 114") that can be etched with known etchants such as those listed above. Non-limited examples of such particles include particles of metal particles including iron (Fe) and aluminum (Al), metal oxide particles including alumina ($Al_2O_3$), magnesium oxide (MgO) and zinc oxide (ZnO), and metal carbonate particles including calcium carbonate ($CaCO_3$), barium carbonate ($BaCO_3$), magnesium carbonate ($MgCO_3$), among others.

Similar to forming the AM part 140p in FIG. 3, an AM part 160p is formed layer-by-layer at step 200 using the thermoset resin 160 and the AM part 160p is etched at step 210 to form the etched AM part 160e. The AM part 160p is formed from successive layers of cured thermoset resin 160c and has a surface 162 that is exposed to an etchant at step 210 such that an etched surface 162e is provided. However, and in contrast to the AM part 140p formed from the thermoset resin 140, the etchant removes or dissolves the etchable particles 114 at the etched surface 162e such that a plurality of micro-mechanical bonding sites 113 are formed on the etched surface 162e. It should be understood that the micro-mechanical bonding sites 113 enhance bonding of a metal coating deposited on the etched surface 162e as discussed below with reference to FIG. 7.

Figure 6:
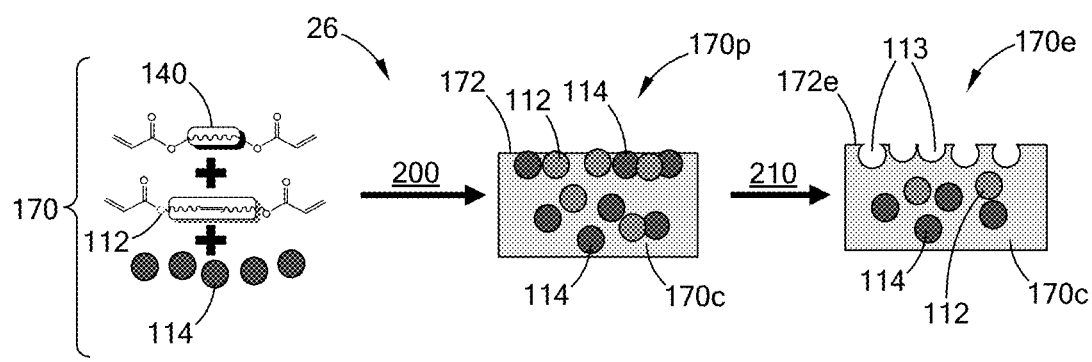
FIG. 6 is a cross-sectional view of a substrate, before and after etching of the substrate, formed via vat photopolymerization using a resin according to yet another form of the present disclosure.

Referring to FIG. 6, a method 26 of forming an etched AM part 170e using a thermoset resin 170 according to the teachings of the present disclosure is shown. Particularly, the thermoset resin 140 in FIG. 1 is replaced with the thermoset resin 170. Also, the thermoset resin 170 includes the VPP thermoset resin 140, the etchable phase 112, and the etchable particles 114 disposed in the VPP thermoset resin 140.

Similar to forming the AM part 140p in FIG. 3, an AM part 170p is formed layer-by-layer at step 200 using the thermoset resin 170 and the AM part 170p is etched at step 210 to form the etched AM part 170e. The part 170p is formed from successive layers of cured thermoset resin 170c and has a surface 172 that is exposed to an etchant at step 210 such that an etched surface 172e is provided. However, and in contrast to the AM part 140p formed from the thermoset resin 140, the etchant removes or dissolves the etchable phase 112 and the etchable particles 114 at the etched surface 172e such that a plurality of micro-mechanical bonding sites 113 are formed on the etched surface 172e. It should be understood that the micro-mechanical bonding sites 113 enhance bonding of a metal coating deposited on the etched surface 172e as discussed below.

Figure 7:
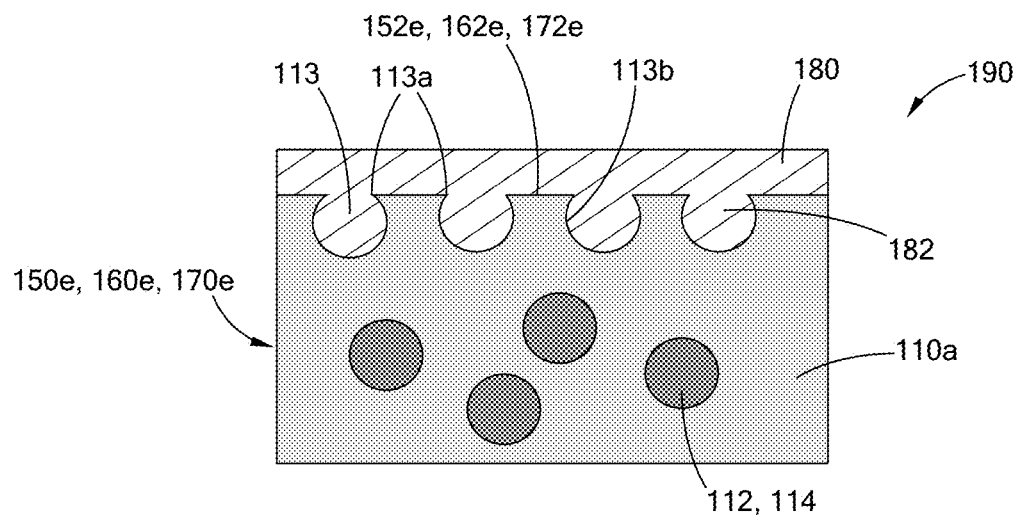
FIG. 7 is a cross-sectional view of the substrates in FIGS. 4-6, after etching of the substrate, and after metal plating of the etched substrate according to the teachings of the present disclosure.

Referring now to FIG. 7, the etched AM part 150e, 160e, 170e is shown with a metal coating 180 applied and bonded to the etched surface 152e, 162e, 172e such that a metal coated AM part 190 is provided. The micro-mechanical bonding sites 113 provide edges 113a and undercut areas 113b that enhance the bonding (e.g., mechanical bonding) of the metal coating 180 to the etched AM part 150e, 160e, 170e. In addition, the micro-mechanical bonding sites 113 provide volumes of void space within which metal 182 deposits during deposition of the metal coating 180 such that at least a portion of the metal coating 180 is encapsulated within the etched surface 152e, 162e, 172e of the etched AM part 150e, 160e, 170e. In addition, the micro-mechanical bonding sites 113 provide for metal plating of AM parts formed from thermoset resins using standard or conventional metal plating techniques and equipment. Non-limiting examples of such standard or conventional metal plating techniques include electroplating, electroless plating, physical vapor deposition (PVD), vacuum metallization and spray metal coating, among other. And non-limiting examples of standard or conventional metal plating equipment include, racks, dip tanks, metallization chambers, and plasma arc guns, among others. Also, non-limiting examples of the metal coating 180 include a chromium or chromium alloy coating, a nickel or nickel alloy coating, a copper or copper alloy coating, an aluminum or aluminum alloy coating, and combinations thereof, among others.

Figure 8:
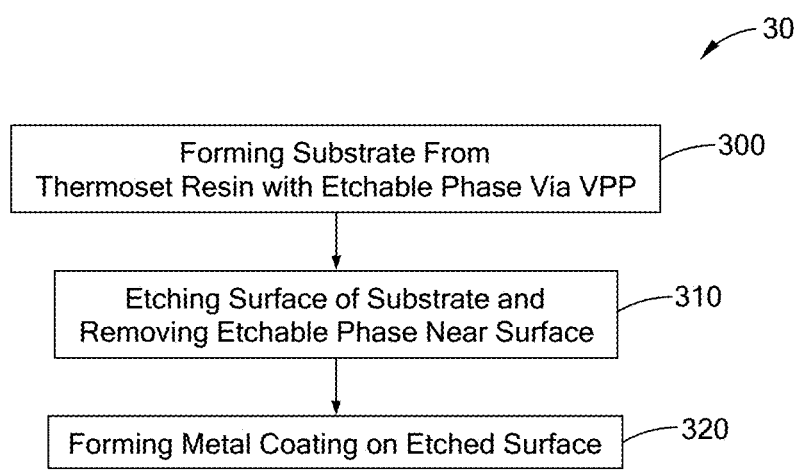
FIG. 8 is a flow chart for a method 30 of forming a metal plated part according to the teachings of the present disclosure.

Referring now to FIG. 8, a flow chart for a method 30 of forming a metal plated part is shown. The method 30 includes forming a substrate from a thermoset resin with an etchable phase via VPP at 300 and etching a surface of the substrate at 310. Etching of the surface removes at least a portion of the etchable phase proximate the surface of the substrate and forms a plurality of micro-mechanical locking sites at 310 at the surface. Then, a metal coating is deposited or formed on the etched surface at 320, e.g., using standard or conventional metal plating techniques and equipment, and the metal coating is attached to the etched surface at the plurality of micro-mechanical locking sites.

It should be understood from the teachings of the present disclosure that a thermoset resin for forming parts via VPP is provided. The thermoset resin provides for VPP parts that have a desired surface or surface finish that can be etched and subsequently metal plated. For example, the surface quality of the VPP parts is free of undesirable surface artifacts that show through a metal coating applied to the VPP parts. As used herein, the phrase "undesirable surface artifacts" refers to surface blemishes, lines and/or porosity resulting from the AM process(es) that forms the parts. Such AM processes include but are not limited to extrusion printing processes such as fusion filament formation (FFF) and fused deposition modeling (FDM), and powder bed fusion processes such as powder bed fusion (PBF), multi jet fusion (MJF), high speed sintering (HSS), and selective laser sintering (SLS).

In some variations, the thermoset resin is a mixture of monomers, oligomers, photoinitiators, and the etchable phase, and in at least one variation the etchable phase is at least one of organic particles, organic resins, inorganic particles, copolymers of the VPP thermoset polymer, and combinations thereof, among others. In some variations the etchable phase is a polybutadiene phase. In other variations the etchable phase is a mineral phase, for example, calcium carbonate.

In some variations the metal coating is applied on the etched surface using electroless deposition. For example, an electroless nickel coating can be applied or deposited on the etched surface. In such variations, electrolytic deposition of copper can be applied or deposited across the electroless deposited nickel. Also, electrolytic deposition of chromium can be applied or deposited onto the electrolytic deposited nickel.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming an etched part, the method comprising:
    forming a substrate comprising a thermoset resin, the thermoset resin comprising a vat photopolymerization (VPP) thermoset resin and at least one of an etchable phase and etchable particles disposed within the VPP thermoset resin; and
    etching a surface of the substrate,
    wherein the etching removes the etchable phase from the VPP thermoset resin at the surface of the substrate such that a plurality of micro-mechanical bonding sites is formed on an etched surface of the substrate.

2. The method according to claim 1, wherein the forming the substrate includes forming, layer-by-layer, an additively manufactured part.

3. The method according to claim 2 further comprising curing each layer of thermoset resin after depositing each layer of thermoset resin.

4. The method according to claim 2, wherein the forming the substrate comprises one of stereolithography additive manufacturing, digital light processing additive manufacturing, and continuous liquid interface production additive manufacturing.

5. The method according to claim 1, wherein the VPP thermoset resin comprises at least one monomer, at least one oligomer, and at least one photo initiator.

6. The method according to claim 5, wherein the at least one monomer is selected from the group consisting of a (meth)acrylate monomer and a vinyl ether.

7. The method according to claim 6, wherein the (meth) acrylate monomer comprises at least one of a monofunctional monomer, a difunctional monomer, and a multifunctional monomer, and wherein the vinyl ether comprises at least one of diethylene glycol divinyl ether (DEGDE), cyclohexane dimethanol divinyl ether (CHDMDE), and triethylene glycol divinyl ether (TEGDE).

8. The method according to claim 5, wherein the at least one oligomer comprises at least one acrylated oligomer selected from the group consisting of polyurethane (meth) acrylate, polyether (meth)acrylate, polyester (meth)acrylate, epoxy (meth)acrylate, phenolic (meth)acrylate, amino (meth)acrylate, and silicone (meth) acrylate.

9. The method according to claim 1, wherein the etchable phase comprises a resin phase selected from the group consisting of polybutadiene (meth)acrylate, polyisoprene (meth)acrylate, polychloroprene (meth)acrylate, unsaturated polyester (meth)acrylate, and alkyd (meth)acrylate.

10. The method according to claim 1, wherein the thermoset resin comprises both an etchable phase and etchable particles disposed within the VPP thermoset resin.

11. The method according to claim 1, wherein the etchable particles comprise at least one of metal particles, metal oxide particles, and metal carbonate particles.

12. The method according to claim 11, wherein the metal particles comprise at least one of iron and aluminum, the metal oxide particles comprise at least one of alumina, magnesium oxide, and zinc oxide, and the metal carbonate particles comprise at least one of calcium carbonate, barium carbonate, and magnesium carbonate.

13. The method according to claim 1, wherein the etching comprises using an etchant, and wherein the etchant comprises at least one of oxidizing acid solutions and chromic acid etchants.

14. The method according to claim 1 further comprising bonding a metal layer to the etched surface of the substrate.

15. A method of forming a metal plated part comprising:
forming a substrate via vat photopolymerization (VPP), wherein the substrate comprises a thermoset resin with an etchable phase disposed therein;
etching a surface of the substrate to remove at least a portion of the etchable phase proximate the surface of the substrate and to form a plurality of micro-mechanical locking sites at the surface of the substrate; and
forming a metal layer on the etched surface of the substrate, such that the metal layer is bonded to the etched surface of the substrate at the plurality of micro-mechanical locking sites.

16. The method according to claim 15, wherein forming the metal layer comprises at least one of electroplating, electroless plating, physical vapor deposition (PVD), vacuum metallization, and spray metal coating.

17. The method according to claim 15, wherein the metal layer is selected from the group consisting of of a chromium layer, a chromium alloy layer, a nickel layer, a nickel alloy layer, a copper layer, a copper alloy layer, an aluminum layer, an aluminum alloy layer, and combinations thereof.

18. The method according to claim 15, wherein at least a portion of the metal layer is encapsulated within the etched surface of the substrate.

19. The method according to claim 15, wherein the thermoset resin comprises a mixture of monomers, oligomers, and photoinitiators.

20. The method according to claim 15, wherein the etchable phase comprises at least one of organic particles, organic resins, inorganic particles, and copolymers of the thermoset resin.

* * * * *